United States Patent
Feder et al.

(10) Patent No.: US 9,746,900 B2
(45) Date of Patent: *Aug. 29, 2017

(54) SYSTEM AND METHOD FOR REDUNDANT OBJECT STORAGE

(71) Applicant: Dell Products L.P., Round Rock, TX (US)

(72) Inventors: Seth Feder, Austin, TX (US); Farzad Khosrowpour, Pflugerville, TX (US); Kevin Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,638

(22) Filed: Feb. 10, 2016

(65) Prior Publication Data

US 2016/0162005 A1 Jun. 9, 2016

Related U.S. Application Data

(63) Continuation of application No. 14/461,922, filed on Aug. 18, 2014, now Pat. No. 9,292,393, which is a (Continued)

(51) Int. Cl.
*G06F 1/32* (2006.01)
*G06F 3/06* (2006.01)
(Continued)

(52) U.S. Cl.
CPC .......... *G06F 1/3209* (2013.01); *G06F 1/3203* (2013.01); *G06F 1/3246* (2013.01); *G06F 1/3296* (2013.01); *G06F 3/0617* (2013.01); *G06F 3/0632* (2013.01); *G06F 3/0647* (2013.01); *G06F 3/0683* (2013.01); *G06F 3/0689* (2013.01); *G06F 11/1458* (2013.01); *G06F 11/2017* (2013.01); *G06F 11/2048* (2013.01); *G06F 17/30306* (2013.01);
(Continued)

(58) Field of Classification Search
None
See application file for complete search history.

(56) References Cited

U.S. PATENT DOCUMENTS 5,664,187 A * 9/1997 Burkes .................. G06F 3/0601
707/999.2
5,774,660 A 6/1998 Brendel et al. ............... 709/201
(Continued)

*Primary Examiner* — Azizul Choudhury
(74) *Attorney, Agent, or Firm* — Baker Botts L.L.P.

(57) ABSTRACT

Systems and methods for redundant object storage are disclosed. A method may include storing at least two copies of each of a plurality of objects among a plurality of nodes communicatively coupled to one another in order to provide redundancy of each of the plurality of objects in the event of a fault of one of the plurality of nodes. The method may also include monitoring access to each object to determine a frequency of access for each object. The method may additionally include redistributing one or more of the copies of the objects such that at least one particular node of the plurality of nodes includes copies of only objects accessed at a frequency below a predetermined frequency threshold based on the determined frequency of access for each object. The method may further include placing the at least one particular node in a reduced-power mode.

18 Claims, 3 Drawing Sheets

Related U.S. Application Data continuation of application No. 12/755,104, filed on Apr. 6, 2010, now Pat. No. 8,839,027.

(51) Int. Cl.
  *G06F 17/30* (2006.01)
  *G06F 11/14* (2006.01)
  *G06F 11/20* (2006.01)

(52) U.S. Cl.
  CPC .... *G06F 17/30578* (2013.01); *G06F 11/2035* (2013.01); *G06F 11/2043* (2013.01); *G06F 11/2046* (2013.01); *G06F 11/2089* (2013.01); *G06F 11/2094* (2013.01); *G06F 2201/805* (2013.01); *G06F 2201/84* (2013.01); *Y02B 60/1217* (2013.01); *Y02B 60/188* (2013.01)

(56) References Cited

U.S. PATENT DOCUMENTS

| | | | | |
|---|---|---|---|---|
| 5,961,613 | A | 10/1999 | DeNicola | 710/18 |
| 6,282,616 | B1 | 8/2001 | Yoshida et al. | 711/133 |
| 6,859,882 | B2 | 2/2005 | Fung | 713/300 |
| 7,281,088 | B2 * | 10/2007 | Yamazaki | G06F 1/3221 |
| | | | | 711/114 |
| 2011/0246639 | A1 | 10/2011 | Feder et al. | 709/224 |
| 2015/0100822 | A1 | 4/2015 | Ohno | 714/6.32 |

\* cited by examiner

SYSTEM AND METHOD FOR REDUNDANT OBJECT STORAGE

CROSS-REFERENCE TO RELATED APPLICATION

The present application is a continuation application of U.S. patent application Ser. No. 14/461,922 filed Aug. 18, 2014, which is a continuation application of U.S. patent application Ser. No. 12/755,104 filed Apr. 6, 2010, now U.S. Pat. No. 8,839,027 granted Sep. 16, 2014, which is hereby incorporated by reference in its entirety for all purposes.

TECHNICAL FIELD

The present disclosure relates in general to data storage, and more particularly to redundant object storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To improve reliability and fault-protection, information handling systems often employ redundant data storage mechanisms. One type of redundant data storage mechanism is a Redundant Array of Independent Nodes (RAIN). In RAIN implementations, data is replicated to a plurality of nodes (e.g., servers or other information handling systems). Typically, a software management program manages the cluster of RAIN nodes, tracking each copy of the data such that, in the event of failure of one node, the cluster can further replicate data as necessary to maintain a desired level of redundancy.

Typically, objects stored in a RAIN and the replicas of such objects are randomly distributed among the various nodes of the RAIN in order to provide the desired level of redundancy. Thus, to provide redundancy, all nodes of the RAIN must remain fully powered at all times. This need to keep all nodes in a fully-powered state often requires a significant amount of power consumption by the RAIN.

SUMMARY

In accordance with the teachings of the present disclosure, the disadvantages and problems associated with of traditional approaches to redundant object storage have been substantially reduced or eliminated.

In accordance with one embodiment of the present disclosure, a system for redundant object storage may include a plurality of nodes communicatively coupled to one another. The plurality of nodes may be configured to: (a) collectively store at least two copies of each of a plurality of objects in order to provide redundancy of each of the plurality of objects in the event of a fault of one of the plurality of nodes, (b) monitor access to each object to determine a frequency of access for each object, (c) based on the determined frequency of access for each object, redistribute one or more of the copies of the objects such that at least one particular node of the plurality of nodes includes copies of only objects accessed at a frequency below a predetermined frequency threshold, (d) place the at least one particular node in a reduced-power mode.

In accordance with another embodiment of the present disclosure, a method for redundant object storage is provided. The method may include storing at least two copies of each of a plurality of objects among a plurality of nodes communicatively coupled to one another in order to provide redundancy of each of the plurality of objects in the event of a fault of one of the plurality of nodes. The method may also include monitoring access to each object to determine a frequency of access for each object. The method may additionally include redistributing one or more of the copies of the objects such that at least one particular node of the plurality of nodes includes copies of only objects accessed at a frequency below a predetermined frequency threshold based on the determined frequency of access for each object. The method may further include placing the at least one particular node in a reduced-power mode.

In accordance with a further embodiment of the present disclosure, an information handling system may include a processor, a memory communicatively coupled to the processor, a network interface communicatively coupled to the processor and one or more other networked information handling systems, and a computer-readable medium communicatively coupled to the processor and having stored thereon a program of instructions. The program of instructions may be configured to, when executed by the processor: (a) manage redundancy of copies of objects stored on the information handling system, such that the information handling system and the one or more other networked information handling systems are configured to collectively store at least two copies of each of a plurality of objects in order to provide redundancy of each of the plurality of objects in the event of a fault of one of the information handling system and the one or more other networked information handling systems; (b) monitor access to each object having a copy stored on the information handling system to determine a frequency of access for each object having a copy stored on the information handling system; (c) based on the determined frequency of access for each object having a copy stored on the information handling system, redistribute one or more of the copies of the objects stored on the information handling system such that at the information handling system includes copies of only objects accessed at a frequency below a predetermined frequency threshold; and (d) place the information handling system in a reduced-power mode.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring

DETAILED DESCRIPTION

Preferred embodiments and their advantages are best understood by reference to FIGS. 1 through 3B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive, floppy disk, solid-state storage device), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
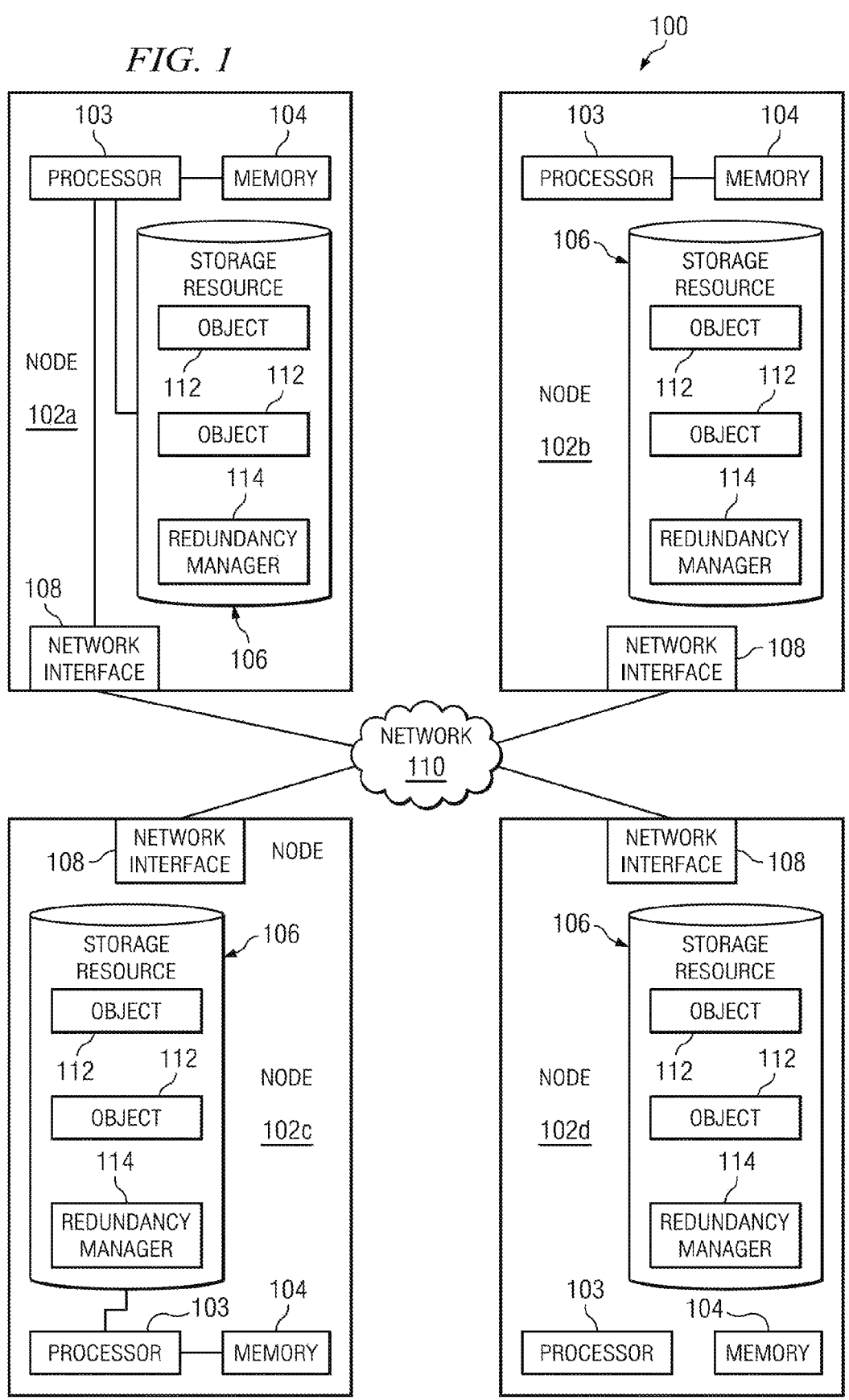
FIG. 1 illustrates a block diagram of an example system for redundant data storage, in accordance with embodiments of the present disclosure.

FIG. 1 illustrates a block diagram of an example system 100 for redundant data storage, in accordance with embodiments of the present disclosure. As depicted in FIG. 1, system 100 may comprise a plurality of nodes 102 (e.g., nodes 102a, 102b, 102c, 102d) and a network 110. In certain embodiments, system nodes 102 may be member nodes of a Redundant Array of Independent Nodes (RAIN).

Each node 102 may comprise an information handling system and may generally be operable to communicate data via network 110 to other nodes 102 or other information handling systems. As depicted in FIG. 1, each node 102 may comprise a processor 103, a memory 104 communicatively coupled to processor 103, a storage resource 106 communicatively coupled to processor 103, and a network interface 108 communicatively coupled to processor 103.

Each processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored and/or communicated by one or more of memory 104, storage resource 106, and/or another component of node 102.

Each memory 104 may be communicatively coupled to its corresponding processor 103 and may comprise any system, device, or apparatus configured to retain program instructions or data for a period of time (e.g., computer-readable media). A memory 104 may comprise random access memory (RAM), electrically erasable programmable read-only memory (EEPROM), a PCMCIA card, flash memory, magnetic storage, opto-magnetic storage, solid state storage, or any suitable selection and/or array of volatile or non-volatile memory that retains data after power to information handling system 102 is turned off.

Each storage resource 106 may be communicatively coupled to its associated processor 103 and may include any system, device, or apparatus configured to retain program instructions or data for a period of time (e.g., a computer-readable medium). In some embodiments, a storage resource 106 may include a hard disk drive, a magnetic tape library, an optical disk drive, a magneto-optical disk drive, a compact disk drive, a compact disk drive, a solid state storage drive, a FLASH drive and/or any other suitable computer-readable medium.

As shown in FIG. 1, each storage resource 106 may have stored thereon one or more objects 112. An object 112 may include an item of data, including without limitation, a text file, a video file, an image file, an audio file, an executable file, any other type of file, or any portion thereof. Collectively, the storage resources 106 of nodes 102 may provide data redundancy such that an object 112 present on one node 102 is replicated on one or more other nodes 102, such that collectively, nodes 102 include a primary copy of each object 112 and at least one redundant copy of each object 112.

In addition, storage resource 106 of one or more nodes 102 may have stored thereon a redundancy manager 114. A redundancy manager 114 may include one or more computer-readable instructions that may, when retrieved from storage resource 106 and executed by processor 103, manage the redundancy, replication, and distribution of redundant data among storage resources 106 of the various nodes 102, and/or monitor accesses to objects 112 stored on its local storage resource, as explained in greater detail below.

Each network interface 108 may include any suitable system, apparatus, or device operable to serve as an interface between its corresponding node 102 and network 110. A network interface 108 may enable its corresponding node 102 to communicate over network 110 using any suitable transmission protocol and/or standard, including without limitation all transmission protocols and/or standards enumerated below with respect to the discussion of network 110. Network interface 108 and its various components may be implemented using hardware, software, or any combination thereof.

Network 110 may be a network and/or fabric configured to communicatively couple nodes 102 to each other, other information handling systems and/or other devices. In certain embodiments, network 110 may include a communication infrastructure, which provides physical connections, and a management layer, which organizes the physical connections of nodes 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In operation, a redundancy manager 114 may monitor objects 112 with copies local to the node 102 associated with the redundancy manager 114 to determine a frequency at which individual objects 112 are accessed. Based on such determined frequencies, a node 102 may redistribute its copies of certain objects 112 local to such node 102 to one or more other nodes 102, and/or may receive copies of other certain objects 112 from one or more other nodes 102. For example, based on determined frequencies, a node 102 may redistribute copies of frequently-accessed objects 112 (e.g., objects 112 accessed with a frequency above a predetermined frequency threshold) to one or more other nodes 102, and may receive copies of rarely-accessed objects 112 (e.g., objects 112 accessed with a frequency below a predetermined frequency threshold) from one or more other nodes 102. In addition, based on determined frequencies, a node 102 may redistribute copies of rarely-accessed objects 112 (e.g., objects 112 accessed with a frequency below a predetermined frequency threshold) to one or more other nodes 102, and may receive copies of frequently-accessed objects 112 (e.g., objects 112 accessed with a frequency above a predetermined frequency threshold) from one or more other nodes 102.

The predetermined frequency threshold may be set by a manufacturer, system administrator, and/or in any other suitable manner. The predetermined frequency threshold may be defined by a number of accesses, a time of one or more accesses, or any combination thereof (e.g., no accesses within past month, 100 accesses since installation, 40 accesses within last week, etc.).

After the redistribution of copies of objects 112 described above, one or more nodes 102 may have copies of only rarely-accessed objects 112 remaining stored thereon. Accordingly, such one or more nodes 102 may enter a reduced-power state (e.g., a "sleep" or "slumber" mode). For example, in a reduced-power state, storage resources 106 of such one or more nodes 102 may be "spun down," processors 103 of such nodes 102 may be placed in a lower-power state (e.g., wherein minimal processing takes place but the processor 103 continues to monitor traffic), and/or other components of such one or more nodes 102 may be set into a reduced-power mode. Alternatively or in addition, network interface 108 of a reduced-power node 102 may continue to listen to network traffic, and may cause node 102 to "wake" or leave the reduced-power state upon receiving a message or indication that an object 112 having a copy stored on the reduced-power node could not be provided by another node 102 (e.g., by reason of failure or fault of a node 102 including another copy of the object 112, network bandwidth constraints, or other fault or failure preventing another node 102 to provide such copy). Accordingly, power consumed by system 100 may be reduced while still maintaining desired redundancy.

In some embodiments, objects 112 may be redistributed among nodes 102 such that each object 112 having a copy stored on reduced-power nodes 102 may also have at least copy of such object stored on a node 102 that is not placed in a reduced-power state (e.g., a node 102 that remains "active") such that least one copy of each object 112 exists on an active (e.g., not placed in reduced-power mode) node 102.

In some embodiments, a node 102 may initiate redistribution and receipt of objects 112 in response to a triggering event. For example, a triggering event may include a command initiated by a system administrator to redistribute objects 112 and enter a reduced-power state as described above.

As another example, a node 102 may begin redistribution of objects 112 in response to a determination (e.g., by redundancy manager 114 or another element of a node 102) that a ratio of copies of rarely-accessed objects 112 to copies of frequently-accessed objects 112 stored on the node 102 exceeds a predetermined ratio. Such predetermined ratio may be set by a manufacturer, system administrator, and/or in any other suitable manner.

As a further example, a node may begin redistribution of copies of objects 112 in response to a determination (e.g., by redundancy manager 114 or another element of a node 102) that a remaining available capacity of a storage resource 106 local to the node has decreased below a predetermined capacity threshold. Such predetermined capacity threshold may be set by a manufacturer, system administrator, and/or in any other suitable manner.

Although system 100 is depicted as having four nodes 102, system 100 may include any number of nodes 102.

Figure 2:
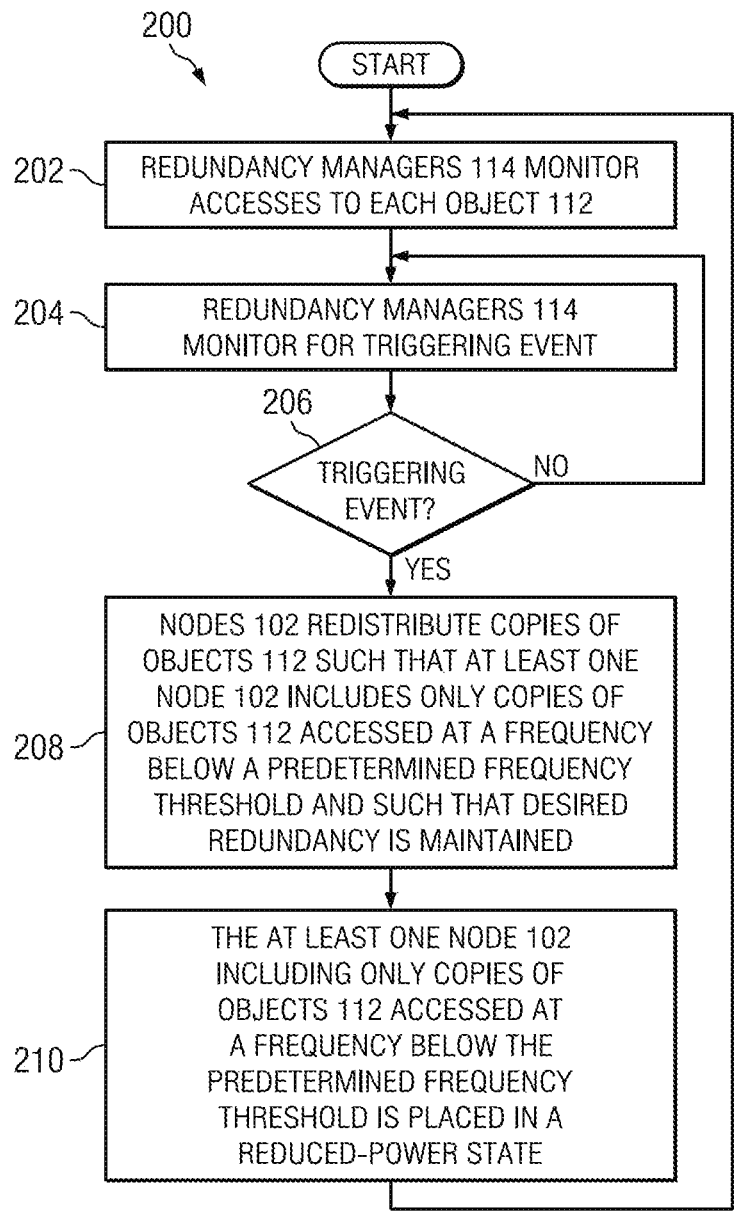
FIG. 2 illustrates a flow chart of an example method for decreasing power requirements of a system for redundant data storage, in accordance with embodiments of the present disclosure.

FIG. 2 illustrates a flow chart of an example method 200 for decreasing power requirements of a system 100 for redundant data storage, in accordance with embodiments of the present disclosure. According to one or more embodiments, method 200 may begin at step 202. As noted above, teachings of the present disclosure may be implemented in a variety of configurations of system 100. As such, the initialization point for method 200 and the order of the steps 202-210 comprising method 200 may depend on the implementation chosen.

At step 202, redundancy managers 114 of nodes 102 may monitor accesses to each object 112.

At step 204, redundancy managers 114 may monitor for a triggering event. A triggering event may include any of the triggering events described above or any other suitable event.

At step 206, redundancy mangers 114 may determine if a triggering event has occurred. If a triggering event has occurred, method 200 may proceed to step 208. Otherwise, if a triggering event has not occurred, method 200 may proceed again to step 204.

At step 208, in response to a triggering event, nodes 102 may redistribute copies of objects 112 such that at least one node 102 includes only copies of objects 112 accessed at a frequency below a predetermined frequency threshold and such that desired redundancy of system 100 is maintained.

At step 210, the at least one node 102 including only copies of objects 112 accessed at a frequency below the predetermined frequency threshold is placed in a reduced-power state.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3A:
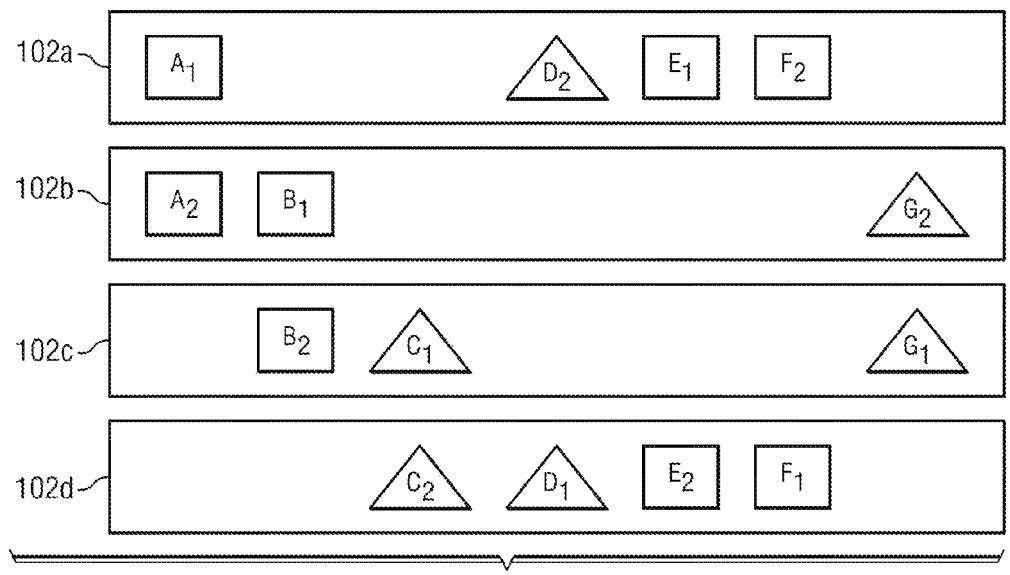
FIGS. 3A and 3B graphically illustrate redistribution of objects among nodes in accordance with the example method of FIG. 2, in accordance with embodiments of the present disclosure.
Figure 3B:
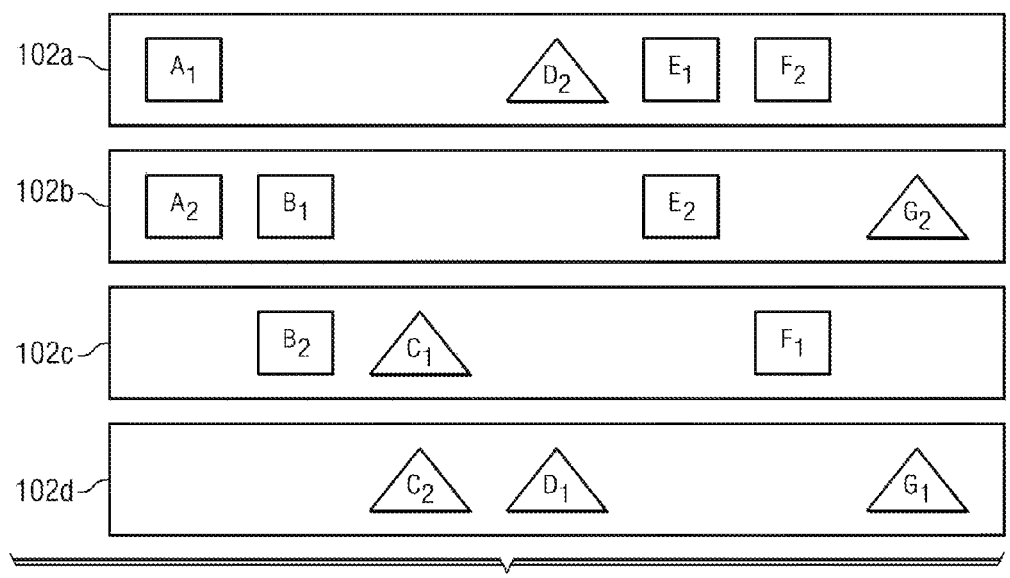

FIGS. 3A and 3B graphically illustrate redistribution of objects among nodes in accordance with the example method of FIG. 2, in accordance with embodiments of the present disclosure. FIG. 3A may represent an example distribution of copies of objects 112 among nodes 102 prior to execution of method 200 and FIG. 3B may represent the redistribution of the copies of objects 112 depicted in FIG. 3A following execution of method 200.

In FIGS. 3A and 3B, capital letters A-G represent individual objects 112 and subscripts "1" and "2" may represent the primary copy and a redundant copy, respectively, of an object 112 (e.g., "$B_1$" represents the primary copy of an object 112 and "$B_2$" represents a redundant copy of the same object 112). A rectangle around a particular capital letter/subscript combination represents that the object 112 is a frequently-accessed object 112 for the purposes of this illustration, and a triangle around a particular capital letter/subscript combination represents that the object 112 is a rarely-accessed object 112 for the purposes of this illustration (e.g., objects A, B, E, and F are frequently-accessed; objects C, D, and G are rarely accessed).

Before execution of method 200, node 102d of this example may include copies of rarely-accessed objects C and D ($C_2$ and $D_1$) and copies of frequently-accessed objects E and F ($E_2$ and $F_1$), as shown in FIG. 3A. During execution of method 200, copies of the frequently-accessed objects E and F ($E_2$ and $F_1$) may be redistributed to other nodes 102 (e.g., copy $E_2$ redistributed to node 102b and copy $F_1$ redistributed to node 102c), as depicted in FIG. 3B. Also, in accordance with certain embodiments of the present disclosure, node 102d may receive copies of rarely-accessed objects from other nodes 102. For example, with respect to this illustration, node 102d may receive a copy ($G_1$) of rarely-accessed object G. As is evident from FIG. 3B, the operation of method 200 leaves node 102d with copies of only rarely-accessed objects C, D, and G. Accordingly, node 102d may be placed in a reduced-power state because of the low likelihood that objects C, D, and G will be accessed, and redundancy among nodes 102a-102d is maintained.

For the purposes of illustration, FIGS. 3A and 3B depict a system including basic redundancy having two copies of each object 112. The methods and systems described herein may also be applied to other redundancy schemes (e.g., schemes having 3 or more copies of each object 112 among the various nodes 102).

Using the methods and systems disclosed herein, problems associated with conventional approaches to data storage of redundant data may be reduced or eliminated. For example, the methods and systems disclosed may allow for desired data redundancy to be maintained while lowering system power requirements.

Although the present disclosure has been described in detail, it should be understood that various changes, substitutions, and alterations can be made hereto without departing from the spirit and the scope of the disclosure as defined by the appended claims.

What is claimed is:

1. A method for redundant data object storage, comprising:
    monitoring respective access to at least two copies of a data object stored among a plurality of information handling systems communicatively coupled together;
    determining a frequency of access for each copy of the data object based on the monitoring;
    including the data object in a first set if the frequency of access is below a predetermined frequency threshold, otherwise including the data object in a second set;
    for data objects stored on a first information handling system in the plurality of information handling systems, determining a ratio of a first size of the first set to a second size of the second set; and
    setting, by a microcontroller of a processor of the first information handling system, a reduced-power mode for the first information handling system based on the determined ratio.

2. The method of claim 1, wherein setting the reduced-power mode for the first information handling system further comprises:
    determining that the ratio exceeds a predetermined value; and
    redistributing the second set from the first information handling system to a second information handling system included in the plurality of information handling systems if the ratio exceeds the predetermined value.

3. The method of claim 1, wherein the first size of the first set includes data objects for which a copy is stored on a different one of the plurality of information handling systems than the first information handling system.

4. The method of claim 1, wherein setting the reduced-power mode for the first information handling system further comprises redistributing the second set from the first information handling system to a second information handling system included in the plurality of information handling systems in response to a command received from a system administrator.

5. The method of claim 1, wherein setting the reduced-power mode for the first information handling system further comprises:
    determining a first available storage capacity of the first information handling system; and
    redistributing the second set from the first information handling system to a second information handling system included in the plurality of information handling systems if the first available storage capacity is below a predetermined capacity threshold.

6. The method of claim 1, wherein the predetermined frequency threshold is based on a number of access events for the data object within a time period.

7. The method of claim 1, wherein the reduced-power mode specifies reducing power consumption of a storage resource.

8. The method of claim 1, wherein the reduced-power mode specifies reducing power consumption of a processor.

9. The method of claim 1, wherein the plurality of information handling systems are a redundant array of independent nodes.

10. A system for redundant object storage, comprising a plurality of nodes communicatively coupled to one another, wherein each of the plurality of nodes further comprises:
- a processor;
- a network interface communicatively coupled to the processor; and
- a non-transitory computer-readable medium communicatively coupled to the processor and having stored thereon instructions executable by the processor to:
  - monitor respective access to at least two copies of a data object stored among the plurality of nodes;
  - determine a frequency of access for each copy of the data object based on the monitored access;
  - include the data object in a first set if the frequency of access is below a predetermined frequency threshold, otherwise include the data object in a second set;
  - for data objects stored on a first node in the plurality of nodes, determine a ratio of a first size of the first set to a second size of the second set; and
  - set a reduced-power mode for the first node based on the determined ratio by a microcontroller of the processor.

11. The system of claim 10, wherein the instructions to set the reduced-power mode for the first node further comprise instructions to:
- determine that the ratio exceeds a predetermined value; and
- redistribute the second set from the first node to a second node included in the plurality of nodes if the ratio exceeds the predetermined value.

12. The system of claim 10, wherein the first size of the first set includes data objects for which a copy is stored on a different node of the plurality of nodes than the first node.

13. The system of claim 10, wherein the instructions to set the reduced-power mode for the first node further comprise instructions to:
- redistribute the second set from the first node to a second node included in the plurality of nodes in response to a command received from a system administrator.

14. The system of claim 10, wherein the instructions to set the reduced-power mode for the first node further comprise instructions to:
- determine a first available storage capacity of the first node; and
- redistribute the second set from the first node to a second node included in the plurality of nodes if the first available storage capacity is below a predetermined capacity threshold.

15. The system of claim 10, wherein the predetermined frequency threshold is based on a number of access events for the data object within a time period.

16. The system of claim 10, wherein the reduced-power mode specifies reducing power consumption of a storage resource.

17. The system of claim 10, wherein the reduced-power mode specifies reducing power consumption of a processor.

18. The system of claim 10, wherein the plurality of nodes are a redundant array of independent nodes.

* * * * *